United States Patent [19]

Nakayama et al.

[11] Patent Number: 5,272,753
[45] Date of Patent: Dec. 21, 1993

[54] SCRAMBLING APPARATUS

[75] Inventors: Hitoshi Nakayama, Kanagawa; Hideo Tomita, Chiba, both of Japan

[73] Assignee: Sony Corporation, Tokyo, Japan

[21] Appl. No.: 928,458

[22] Filed: Aug. 12, 1992

[30] Foreign Application Priority Data

Aug. 30, 1991 [JP] Japan ................. 3-244992

[51] Int. Cl.⁵ .................................. H04K 1/00
[52] U.S. Cl. .............................. 380/23; 380/25; 380/43; 380/46
[58] Field of Search ............. 380/43, 23, 25, 4, 46

[56] References Cited

U.S. PATENT DOCUMENTS 5,067,154 11/1991 Hosobuchi et al. ............ 380/25
5,148,481 9/1992 Abraham et al. .............. 380/46
5,185,798 2/1993 Hamada et al. ................ 380/23

Primary Examiner—David C. Cain
Attorney, Agent, or Firm—Lewis H. Eslinger; Jay H. Maioli

[57] ABSTRACT

A scrambling apparatus includes an IC card connector for receiving an IC card in which at least either scramble control information or unscramble control information is written in advance, a reading circuit for reading the stored contents of the IC card and a control system for controlling the operation of the apparatus. The scrambling apparatus may also include an IC card connector for receiving a data storing IC card, a data writing circuit for writing scramble control information, unscramble control information and the information related to the operations of the apparatus into the IC card.

3 Claims, 3 Drawing Sheets

SCRAMBLING APPARATUS

BACKGROUND OF THE INVENTION

1. Field of the Invention

The present invention relates to a scrambling apparatus for subjecting information signals such as video signals, audio signals and general data signals to scrambling processing.

2. Description of the Related Art

In chargeable broadcasting by radio transmission such as what is called pay television, for instance, signals are subjected to scrambling processing before they are transmitted in order to prevent a non-subscriber, who has not made a contract for payment with a broadcasting industrial company from viewing the programs. Furthermore, when a special program needs extra charge or when the receivable programs vary according to the conditions of a contract, scrambling processing operations must be varied with the program.

When signals are subjected to scrambling process, they are often controlled by a pseudo-random signal system (scrambling system) and, on the reception side, unscrambling processing is executed by using the same signal system (unscrambling system) as that on the transmission side so as to restore the signals to original signals. A scramble key is transmitted to the random signal system. It is necessary to control the unscrambling processing according to the corresponding conditions of contracts of subscriber such as the type of services, the term of a contract and the sum of money paid and the information related thereto is transmitted to a receiving apparatus.

A conventional scrambling apparatus needs an external computer system connected thereto for the management of the subscribers and scrambling processing control in accordance with the conditions of the contract.

In recent years, for instance, the above-described scrambling apparatus and other broadcasting appliances have often been installed in a vehicle, etc. as a broadcasting station, which is used for the purpose of a sport relay broadcast, a theater relay broadcast, ENG or the like on the spot or while driving the vehicle In such a small space as a broadcasting station in a vehicle, however, the size of the external computer system connected to the scrambling apparatus is a problem. Since the above-described various scramble controlling operations are also executed by operating an inputting device such as a keyboard, the controlling operations are difficult or troublesome within a vehicles.

To solve this problem, the above-described various scramble control may be executed by internally mounting an FDD (floppy disk drive) on the scrambling apparatus and replacing the disc as needed. However, this method still suffers from following problems. Since an FDD is generally susceptible to vibration and shock, it is not fit to be installed in a vehicle. In addition, this method fundamentally requires an DOS (disk operating system) so as to control reading and writing operations for the disk which leads to increase the cost of the software.

If the information on the scrambling operation, the status information related to the operation during the scrambling operation of the scrambling apparatus, etc. are recorded into a recording medium, they are useful not only for the control of the progress of a program and the management of subscribers but also as data for the maintenance and checking of the scrambling apparatus and a lead in finding the troubled part when the scrambling apparatus gets out of order. A floppy disk is, however, unsuitable as such a medium for recording scrambling operation, because it has the above-described problems such as the susceptibility to vibration and shock or expensive software

SUMMARY OF THE INVENTION

Accordingly, it is an object of the present invention to eliminate the above-described problems in the related art and to provide a scrambling apparatus which can execute various scramble control and record the related processing information during scrambling operation without any key operation, which is resistant to vibration and shock, and which is provided with inexpensive software such as OS (Operating System).

To achieve this aim, in one aspect of the present invention, there is provided a scrambling apparatus comprising; an IC card connector for receiving an IC card (IC memory card) in which at least either scramble control information or unscramble control information is written in advance; a reading means for reading the stored contents of the IC card inserted in the IC card connector; and a control system for controlling the operation of each element on the basis of the information read by the reading means.

In another aspect of the present invention, there is provided a scrambling apparatus comprising; an IC card connector for receiving a data storing IC card; and a data writing means for writing scramble control information, unscramble control information and the information related to the operations of the apparatus into the IC card inserted in the IC card connector.

Scramble control and unscramble control can be executed without any key operation by connecting an IC card, in which at least either scramble control information or unscramble control information is written in advance, to an IC card connector so as to read the stored contents Writing the information related to scrambling operation and other operations into the IC card is useful for data processing and maintenance of the apparatus. Furthermore, since the IC card is resistant to vibration and shock and enables direct reading and writing at the required address, inexpensive software can be used in the apparatus.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
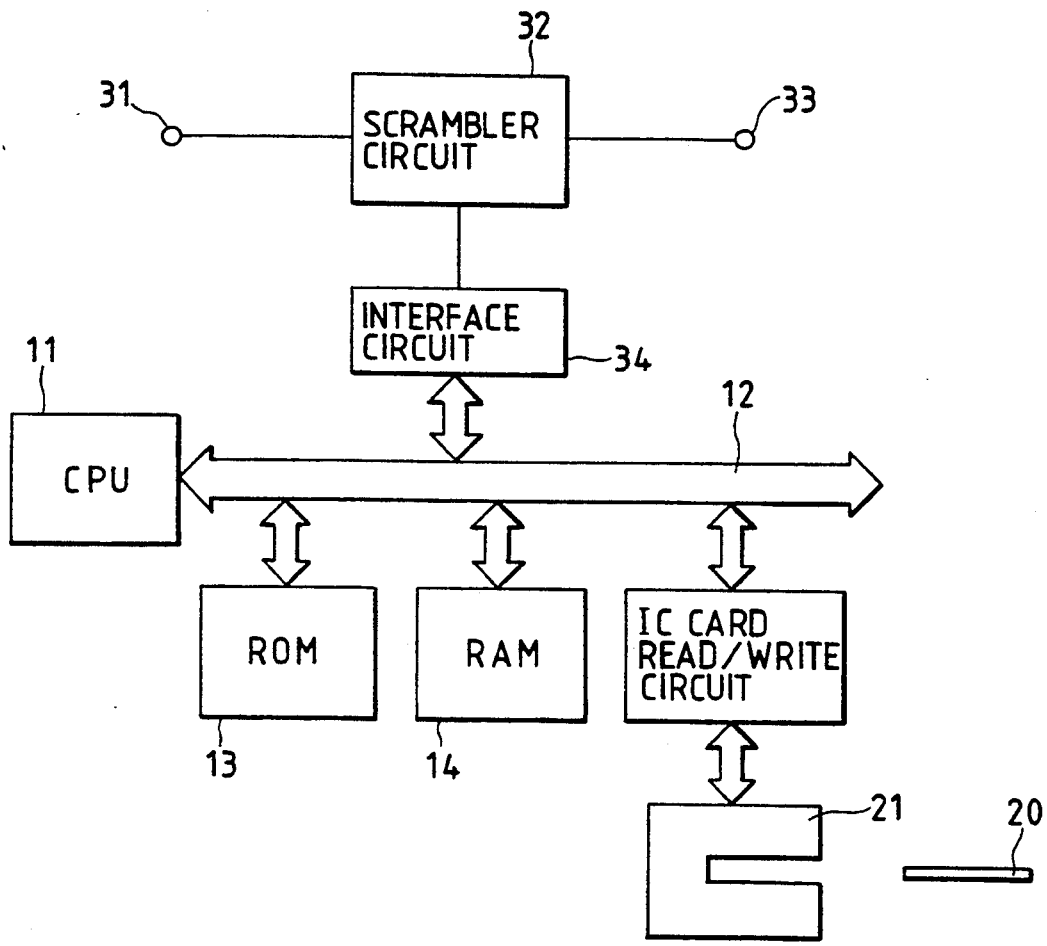
FIG. 1 is a block circuit diagram of an embodiment of a scrambling apparatus according to the present invention.

FIG. 1 is a schematic block diagram of an embodiment of a scrambling apparatus according to the present invention. This scrambling apparatus is fit to be installed in vehicles, because it dispenses with an inputting means such as a keyboard and is composed of a reading and writing means for reading and writing data from and into an IC card which is resistant to vibration and shock.

In FIG. 1, the scrambling apparatus for executing various scrambling processing operations is provided with a CPU 11 such as what is called a microprocessor which controls scrambling processing. To the CPU 11, a bus-line 12 is connected, and a ROM (Read Only Memory) 13 in which programs and data are stored and a RAM (Random Access Memory) 14 for temporary storage are connected to the bus-line 12. An IC card 20 in which at least either scramble control information or unscramble control information is written in advance or data is to be stored is mounted on an IC card connector 21. To the IC card connector 21 is connected an IC card read/write circuit (interface circuit) 22 for reading the stored contents of the IC card such as scramble control information or unscramble control information written therein in advance or writing data into the IC card 20, and the IC card read/write circuit 22 is connected to the bus-line 12.

For instance, a video signal or an audio signal which is to be transmitted is supplied to a scrambling circuit 32 through an input terminal 31, subjected to scrambling processing, output from an output terminal 33, and supplied to a transmitting apparatus or the like. The scrambling circuit 32 is connected to the bus-line 12 through an interface circuit 34.

Figure 2:
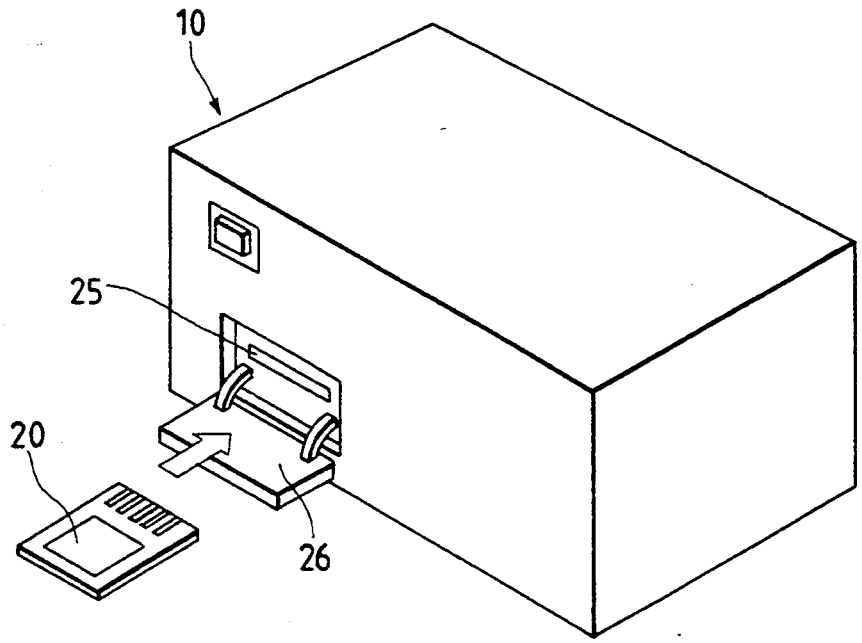
FIG. 2 is a schematic perspective view of the external appearance of the embodiment shown in FIG. 1.

FIG. 2 is schematic perspective view of the external appearance of a scrambling apparatus 10. This scrambling apparatus 10 is fit to be installed in vehicles, because it dispenses with both an inputting means such as a keyboard which takes up a large space and a mechanical element such as a floppy disk drive (FDD) which is susceptible to vibration and shock.

Figure 3:
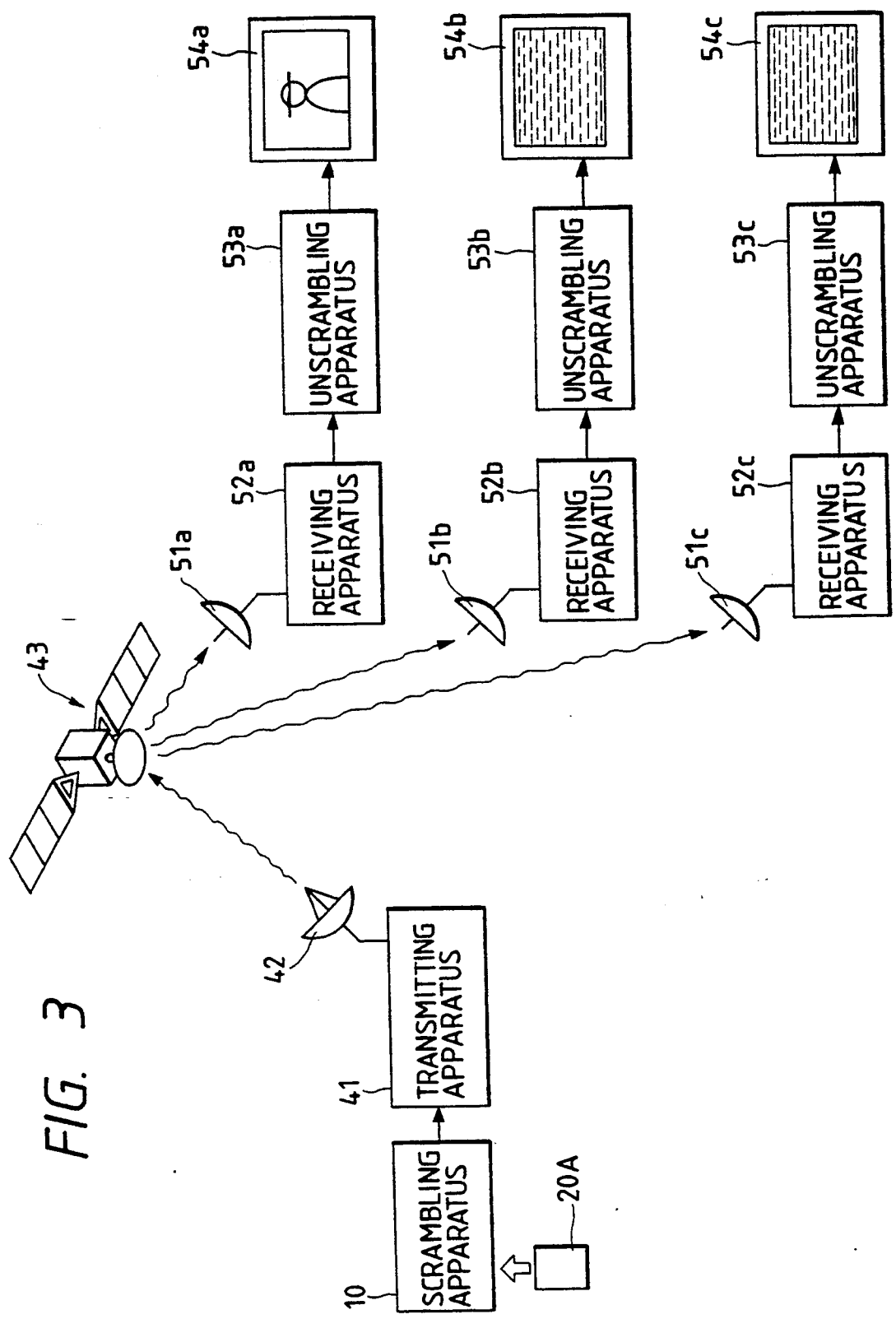
FIG. 3 schematically shows an example of application of the embodiment shown in FIG. 1.
Figure 4:
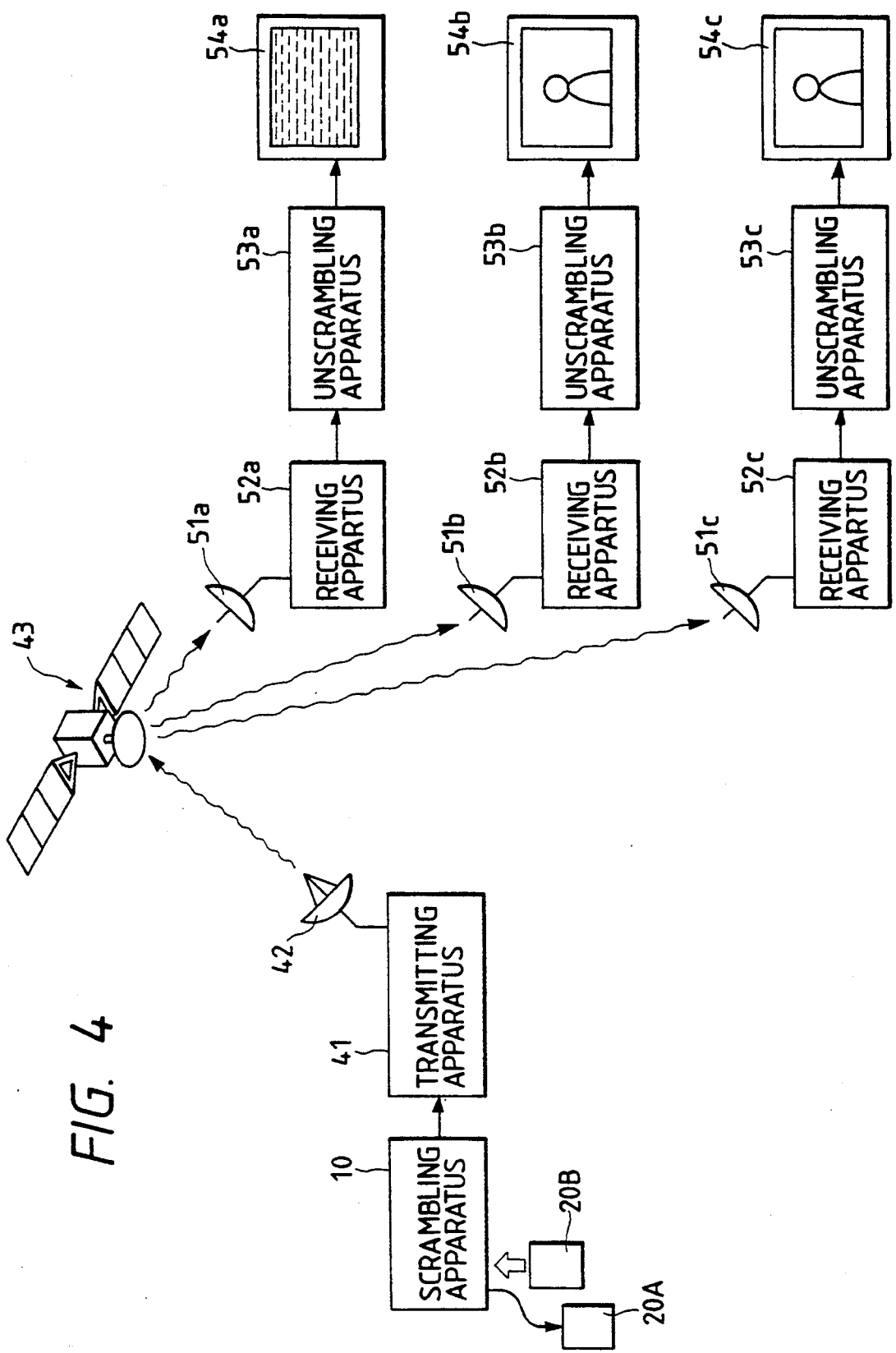
FIG. 4 schematically shows another example of application of the embodiment shown in FIG. 1.

In FIG. 2, the IC card connector 21 is provided with a card slot 25 in the front panel of the box body of the scrambling apparatus 10. The card slot 25 can be covered with a hinged cover 26. When the apparatus 10 is not used, the cover 26 is closed so as to conceal the card slot 25. When the apparatus 10 is used, the card slot 25 is disclosed by opening the cover 26 and an IC card 20 is pushed into the card slot 25 and mounted on the IC card connector 21. At this time, a connection terminal of the IC card 20 is brought into contact with a terminal of the connector 21, thereby establishing electrical connection therebetween When the IC card 20 in which scramble control information or unscramble control information is written in advance is used, it is possible to switch the scrambling mode to the corresponding scrambling control mode merely by mounting a card for the corresponding service contract on the apparatus. In FIG. 3 and 4, for instance, an IC card 20A and an IC card 20B correspond to the respective scrambling control modes which are different from each other in accordance with the different information stored in the respective cards. A scrambling processing is executed according to the control information stored in the IC card 20A and IC card 20B when these cards are mounted on the scrambling apparatus 10. A signal subjected to the scrambling processing is transmitted to a transmitting antenna 42 through a transmitting apparatus 41, sent out as a radio wave, reflected by a geostationary broadcast satellite 43, and received by a receiving apparatus 52 through an antenna 51 in each home or the like. At this time, a received signal transmitted from a receiving apparatus 52a through an antenna 51a is subjected to unscrambling processing by an unscrambling apparatus 53a and reproduced by a monitor television receiver 54a. A received signal transmitted from a receiving apparatus 52b through an antenna 51b is subjected to unscrambling processing by an unscrambling apparatus 53b and reproduced by a monitor television receiver 54b. Similarly, a received signal transmitted from a receiving apparatus 52c through an antenna 51c is subjected to unscrambling processing by an unscrambling apparatus 53c and reproduced by a monitor television receiver 54c. These unscrambling apparatuses 53a, 53b and 53c deal with different service contracts, and the scrambling apparatus 10 on the transmission side, controls so as to enable normal unscrambling processing only by the unscrambling apparatuses of the subscribers whose contracts are valid for the current program by varying the scrambling processing with the broadcasting program.

As is shown in FIG. 3, for instance, when the IC card 20A is mounted on the scrambling apparatus 10, scrambling processing is executed by the scrambling apparatus 10 according to the control information read out of the IC card 20. For instance, according to the control information stored in the IC card 20A unscrambling is allowed to only the unscrambling apparatus 53a and not allowed to the other unscrambling apparatus 53b and 53c. In other words, a normal image can be received only by the monitor television receiver 54a and the program can be enjoyed, but the other monitor television receivers 54b and 54c can not receive a normal image. On the other hand, in the IC card 20B control information which prohibits the unscrambling apparatus 53a from unscrambling and allows unscrambling to the other unscrambling apparatus 53b and 53c is written. As is shown in FIG. 4, when the IC card 20B is mounted on the scrambling apparatus 10 and transmitted after the corresponding scrambling processing, a normal image can be received only by the monitor television receivers 54b and 54c and the program can be enjoyed, but in the other monitor television receiver 54a, the normal image can not be received.

As examples of other control information stored in the IC card 20 in advance, will be cited various mode switching information in the satellite broadcasting format such as information on the sound mode (monaural/bilingual/stereo), information on the digital audio compression modes (A, B or C) and information on the range of line shuffling of video signal. For instance, several combinations of these modes in accordance with the program such as a sport relay broadcast, a theater relay broadcast and ENG are stored in several IC cards in advance, and the IC card selected in accordance with the program being transmitted is mounted on the apparatus.

By replacing an IC card in this way, it is possible to allow unscrambling to the receivers or prohibit the receivers from unscrambling. The apparatus can therefore dispense with a key operation, thereby greatly enhancing the operability. An IC card is fit to be installed in vehicles because it is resistant to vibration and shock Furthermore, since the IC card enables direct reading and writing at the required address, inexpensive software suffices the apparatus.

Referring to FIG. 1 again, information related to the operation such as the status must sometimes be written in the IC card 20 during the scrambling processing by the scrambling apparatus. In this case, the related information during the operation may be transmitted to the IC card read/write circuit 22 by the CPU 11 through the bus-line 12, and the information related to the operation may be written in the IC card 20 by the IC card read/write circuit 22. As the IC card 20, the above-described card in which the control information is written in advance may be used. Alternatively, another blank IC card for storing the related information may be used.

If the information related to the operation during scrambling processing is written into the IC card 20 in the above-described manner and the IC card 20 read by the main computer in a broadcasting station or the like after the end of the program is used as data for the control of the progress of a program, the management of the subscribers and the like, it is possible to save the trouble of inputting the data. It is also useful for the maintenance and checking of the scrambling apparatus, because the IC card 20 shows how the scrambling apparatus has been used. Furthermore, when the scrambling apparatus gets out of order, the IC card 20 can be used as a lead in finding the troubled part. It goes without saying that the IC card 20 is resistant to vibration and shock and inexpensive software is sufficient for the scrambling apparatus.

As is clear from the above explanation, according to the scrambling apparatus of the present invention, since the IC card in which at least either scramble control information or unscramble control information is written in advance is inserted into an IC card connector so as to control the operation of each element in accordance with the information obtained by reading the stored contents thereof, it is possible to control the scrambling processing in accordance with the service merely by replacing an IC card.

Since the information related to the operation is written in the IC card, it can be utilized for the control of the progress of the program and the management of the subscribers. The information is also useful at the time of maintenance and checking of the scrambling apparatus, or repairing a troubled part of the scrambling apparatus.

Furthermore, since the IC card, which is resistant to vibration and shock as compared with a floppy disk or the like, is used as a medium, the scrambling apparatus provided by the present invention is fit to be installed in vehicles and is economically advantageous because it can be supported with inexpensive software.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A scrambling apparatus comprising:
    an IC card connector for receiving an IC card in which scramble control information is written and stored in advance;
    reading means connected to said IC card connector for reading the scramble control information stored in said IC card inserted in said IC card connector; and
    a scrambler circuit for scrambling a signal input thereto in accordance with control information fed to said scrambling circuit;
    a control system for controlling the operation of said scrambler circuit on the basis of the scramble control information read by said reading means from said IC card inserted into said IC card connector.

2. A scrambling apparatus comprising:
    an IC card connector for receiving an IC card;
    data reading and writing means for writing scramble control information, unscrambled control information and operation information related to the operations of said scrambling apparatus into an IC card and for reading scramble control information, unscramble control information and operation information from an IC card inserted in said IC card connector;
    a scrambler circuit for scrambling a transmission signal in response to control information; and
    a control system for controlling said scrambler circuit on the basis of information read by said data reading and writing means from an IC card inserted into said IC card connector.

3. A scrambling apparatus comprising:
    first and second IC cards in which first and second scramble control information is stored in respective ICs formed thereon;
    an IC card connector for receiving one of said first and second IC cards inserted therein;
    reading means connected to said IC card connector for reading stored scramble control information from said one of said first and second IC cards inserted in said IC card connector;
    a scrambler circuit for scrambling a transmission signal in response to control information; and
    a control system for controlling said scrambler circuit on the basis of scramble control information read by said reading means from said one of said first and second IC cards inserted into said IC card connector.

* * * * *